Sept. 24, 1946. J. B. BRENNAN 2,408,038
ARTICLE MADE OF FIBROUS MATERIAL
Filed Dec. 10, 1941 2 Sheets-Sheet 1
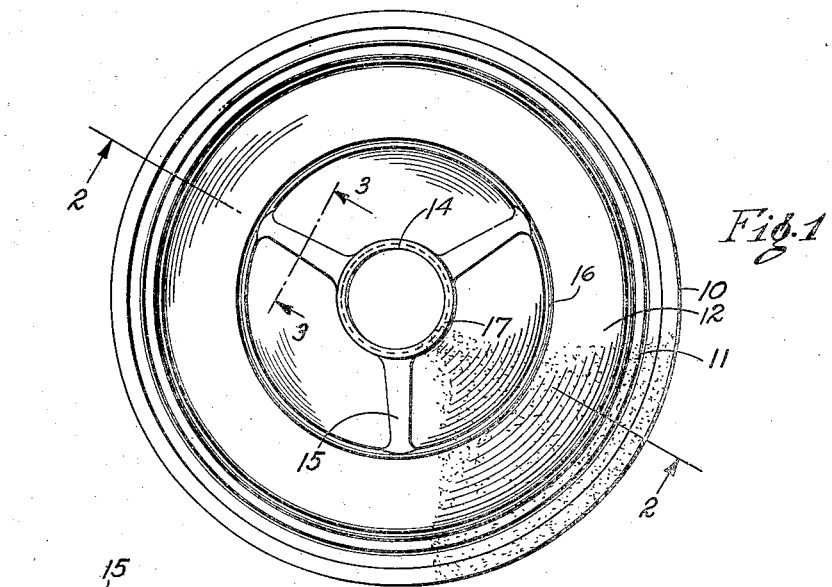
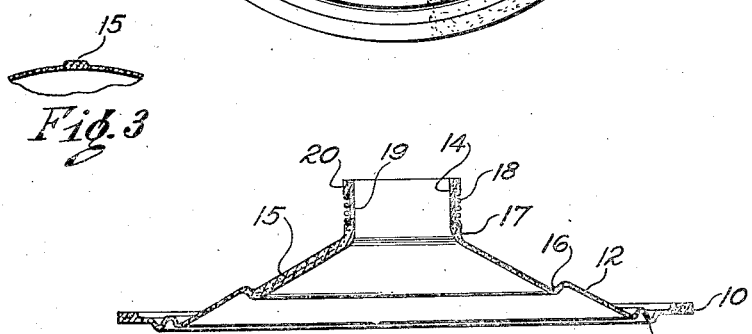
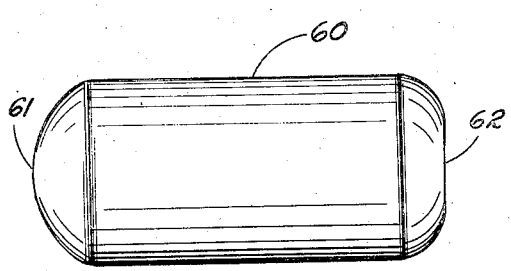
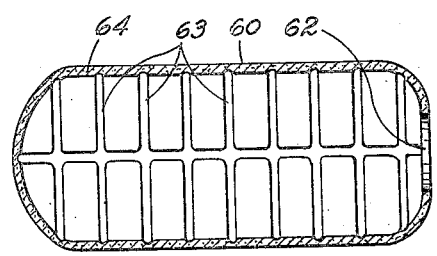
INVENTOR.
JOSEPH B. BRENNAN
BY Bosworth & Sessions
ATTORNEYS

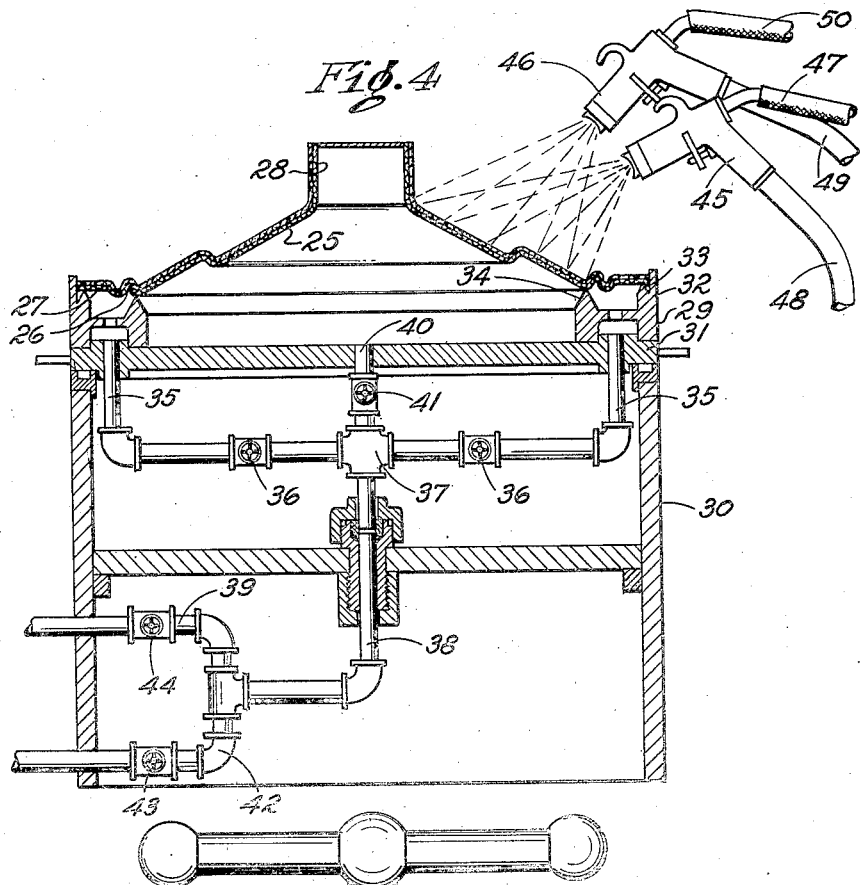
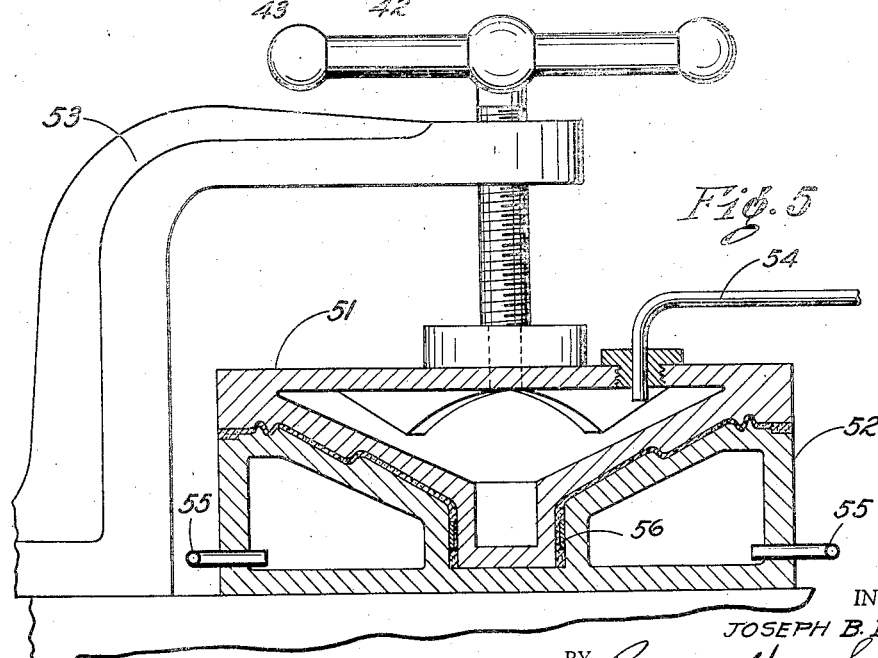

Patented Sept. 24, 1946

2,408,038

UNITED STATES PATENT OFFICE 2,408,038

ARTICLE MADE OF FIBROUS MATERIAL

Joseph B. Brennan, Euclid, Ohio

Application December 10, 1941, Serial No. 422,388

2 Claims. (Cl. 181—32)

This invention relates to articles integrally formed of deposits or accretions of fibrous material, and methods of making such articles. This application constitutes a continuation in part of my copending application Serial No. 121,604, filed January 21, 1937. The invention is described herein with particular reference to the manufacture of acoustic diaphragms such as are employed in radio loud speakers, and to the manufacture of hollow forms, but it is to be understood that the invention is not limited to the particular articles disclosed herein.

One of the objects of my invention is to provide an economical and efficient method of producing hollow articles from fibrous material which can be carried out with a minimum investment in equipment and machinery. Another object is to provide a method of making hollow articles which may be readily varied to produce articles having widely differing characteristics in different portions thereof. Another object is to provide a method of making hollow articles wherein the thickness of the articles may be varied within wide limits in different portions thereof. Another object is to provide such a method wherein the materials may be varied in different portions of the same integrally formed article.

More specifically, it is an object of my invention to provide articles formed integrally of deposited fibrous material having portions of widely varying strength and rigidity. Another object is to provide such articles wherein the stronger portions may be several times the thickness of the weaker portions. Another object is to provide a seamless integrally molded acoustic diaphragm having supporting and strengthening portions of several times the thickness of the principal portions of the diaphragm. Another object is to provide such a diaphragm wherein portions of the supporting flange have a thickness several times as great as the thickness of the body of the conical diaphragm. Further objects and advantages of my invention will become apparent from the following description of preferred forms thereof, reference being made to the accompanying drawings.

Briefly, my invention contemplates the production of hollow articles from fibrous material by the simultaneous but separate spraying of a binder and a fibrous material such as wood flour, pulp, or wool, cotton, or rayon flock or mixtures thereof, in the dry state, upon a form having the general configuration of the finished article. Preferably the operation is carried out by means of two or more spray guns or nozzles placed close together and directed to cover approximately the same area of the form. One spray nozzle is employed to discharge fibrous material in dry form, the material being blown out of the nozzle by a blast of compressed air, for example. Another spray nozzle is employed to discharge the binding material which ordinarily is in liquid form and is atomized by compressed air, for example. If desired, a filler such as powdered clay may be deposited from another nozzle, or from the same nozzle as the fibrous material. The simultaneous but separate spraying of the fibrous material and binder enables the spraying operation to be carried out successfully without difficulty from the clogging of the spray guns and provides a method whereby the finely divided fibrous material and the finely divided binder are intimately mixed in the proper proportions as they are deposited on the form, without requiring excess quantities of liquids in order to form a vehicle for the fibrous materials as was the case with prior methods. Inasmuch as only small quantities of the binder are required and no excess quantities of solvent are necessary, the spraying operation can be carried out rapidly and large quantities of fibrous material properly mixed with binder may be deposited in short periods of time. Further, as there is only a small amount of liquid to be handled, it is not necessary to deposit the material upon a perforated form employing suction to remove the excess liquid although this mode of operation can be employed if desired. Because of the small amount of liquid required, the deposited material dries rapidly and can be handled shortly after it is deposited on the form. By spraying the material in atomized condition, a smooth deposit, without pits due to entrapped air, is produced. Further, the material can be built up into layers indefinitely thick which is not possible with systems wherein large quantities of liquid must be taken care of. The deposition of a succeeding layer with my method does not wash away or damage the preceding layer of material because there is so little liquid binder present.

My method also makes possible the use of a wide variety of materials. The fibrous material may be composed of paper pulp, cotton, rayon, wool flock, felt, and other similar materials. Various fillers may be employed. As binders, various lacquers and resins both natural and synthetic, various plastic materials, latex and varnish may be used. Water solutions of cement or plaster-like substances may also be used, for example, I may discharge an atomized solution of plaster of Paris with paper pulp to provide a form very useful for specialized purposes. Different materials or combinations of materials may be used for different portions of the same integral article, to produce desired characteristics. The deposited material may be dried and subjected to further pressing or molding operations after the deposition has been completed if desired.

Referring now to the drawings, in Fig. 1 I have illustrated a plan view of an acoustic diaphragm made according to my invention; Fig. 2 is a section as indicated by the line 2—2 of Fig. 1; Fig. 3 is a sectional detail as indicated by the line 3—3 of Fig. 1; Fig. 4 somewhat diagrammatically illustrates the step of depositing the fibrous material in the manufacture of the diaphragm shown in Figs. 1 to 3, inclusive, while Fig. 5 illustrates the step of pressing the diaphragm; Fig. 6 is an elevation of a cylindrical form made according to my invention, and Fig. 7 is an axial section through the form of Fig. 6.

As shown in Figs. 1 to 3, an acoustic diaphragm made according to my invention may comprise a supporting flange 10 joined by a corrugated flexible portion 11 to the main conical portion 12 which terminates in a substantially cylindrical neck portion 14. Ordinarily, such diaphragms are made of substantially uniform thickness throughout, or if there are any variations in thickness, such variations ordinarily consist in the formation of thin, weak portions to increase the flexibility of the diaphragms in certain areas. The reason for this type of construction is that the integrally formed diaphragms are ordinarily produced by a suction process of depositing the fibrous material upon a screen from a very dilute suspension thereof and the thickness of material which can be deposited by such a process is limited. In my method, however, where the materials are deposited by the simultaneous spraying from spray guns of the fibrous material and binder, there is no such limitation and after the minimum thickness of material has been deposited upon the form, other areas may be given coatings of any desired thickness by merely blanking off or masking the areas of lesser thickness and continuing the spraying operation.

I have taken advantage of this ability in the production of the diaphragm shown herein. Thus, while the major part of the conical diaphragm 12 is of substantially uniform thickness throughout, certain portions thereof are made preferably several times the thickness of the main areas in order to provide strength and rigidity of the diaphragm where these characteristics are required without impairing the lightness and flexibility of the remainder of the diaphragm. Thus, the flange 10 is made several times thicker than the adjacent corrugated supporting portion 11, providing a flange which can be clamped into the framework of the loud speaker in which the diaphragm is to be employed without requiring the use of any supplementary gaskets or packing material. Similarly, the portion of the diaphragm 12 adjacent the voice coil support or neck 14 is reinforced by evenly spaced radially extending thickened portions 15 which extend from the voice coil to the corrugation 16. These also can be made of substantial thickness and provide a connection of increased rigidity between the voice coil and the outer portions of the diaphragm so that the vibrations of the voice coil may be transmitted throughout the diaphragm with greater efficiency.

The connection between the voice coil support and diaphragm is a point of weakness in the usual conical diaphragm. In my construction this weakness is eliminated by providing a ring of increased thickness as at 17, forming in effect a fillet connecting the cylindrical neck and the conical portion 12 and strengthening the diaphragm at this point.

To provide a convenient space for winding the voice coil 18, the thickness of the voice coil support 14 is reduced to substantially the minimum at 19 and then increased again adjacent the open end thereof as at 20 to provide an annular recess to receive the voice coil. By this arrangement the voice coil may be retained in proper position on the neck 14, and the additional thickness of the neck at opposite ends of the voice coil reinforces the neck and assists in enabling it to maintain its cylindrical shape during the operations of winding the voice coil and in service. Inasmuch as it is desirable to employ as small an air gap as possible in the completed speaker, the thickened portions 17 and 20 preferably are made with an external diameter substantially the same as the external diameter of the voice coil 18. Thus, the thickened portions take up no additional space in the air gap and do not reduce the efficiency of the speaker.

Figs. 4 and 5 diagrammatically illustrate steps in a preferred method of making such acoustic diaphragms. As shown in Fig. 4, the fibrous material and binder may be deposited upon a suitable form having a generally conical body portion 25, a corrugated portion 26, a flange 27 and a neck 28 at the apex thereof. The exterior of this form conforms substantially to the interior of the diaphragm shown in Figs. 1 to 3. The form is illustrated in the drawings as being perforated although as noted above solid forms may be employed. The form may be supported upon a turntable indicated generally at 29 and carried by suitable bearings upon a base 30. The turntable is composed of a round plate 31 on which is mounted an annular channel section member 32 proportioned so that when the perforated form 25 is placed thereon, contact is made with the form between annular ridges 33 and 34. The annular channel between the ridges may be connected through pipes 35, valves 36, connection 37 and pipes 38 and 39, to a source of vacuum. The central portion within the channel member 32 may likewise be connected to the same source of vacuum through the pipe 40, valve 41, connection 37, and pipes 38 and 39. The pipe 42 leads to a source of pressure, the pressure being controlled by the valve 43 just as the vacuum in the pipe 39 is controlled by the valve 44. By this arrangement of valves and piping either pressure or vacuum may be applied to the under side of the form 25 and variations of pressure in the central portion and edge portion of the form may be obtained by proper manipulation of the valves 36 and 41. Ordinarily a suction is applied during the spraying operation to assist in the deposition of the material and drying thereof, while pressure may be applied to assist in removing the deposited material from the form.

In order to deposit the fibrous material and the binder upon the form, two or more spray guns 45 and 46 are employed. As shown in the drawings, these are preferably disposed closely adjacent one another and as indicated diagrammatically, the nozzles are directed so as to cover substantially the same area of the form 30. The spray gun 45 is arranged to project a dry mixture of air and fibrous material, the air atomizing and finely dividing the fibrous material so that it may be uniformly deposited on the form and intimately mixed with the binder, and being supplied under pressure through the tube 47 and the fibrous material through the tube 48. The other spray gun 46 is arranged simultaneously to deposit the binder which is supplied to the gun in liquid form through the conduit 49 while air under pressure for atomizing the material is supplied through the conduit 50. Both guns may be provided with suitable valves for controlling the proportions and amounts of materials discharged, and both may be constructed according to known designs.

In producing the acoustic diaphragm of Figs. 1 to 3, the turntable is rotated and the spray guns directed toward the form to deposit a thin layer of fibrous material and binder thereon, the thickness of the layer being substantially uniform throughout and substantially equal to the thickness of the conical portion 12 in the completed diaphragm. When this layer has been built up on the form, all of the form except those portions which are to receive an additional deposit are blanked out or masked by suitable mask preferably cut from sheet metal and arranged to cover the entire form except in the area where the flange 10, the radial reinforcements 15 and the peripheral reinforcements 17 and 20 are to be produced. With the mask in position, the spraying operation is continued to provide the desired additional thickness, thereby producing a structure having the general contour shown in Figs. 1 to 3.

After the deposited material has dried sufficiently so that it can be handled, (it is to be noted that in view of the fact that only a small amount of liquid is required with the binder, the drying operation takes place very rapidly), the material, if desired, may be subjected to a pressing operation as indicated diagrammatically in Fig. 5. Complementary molds may be employed, the male mold 51 having the contour of the interior of the diaphragm while the female mold 52 corresponds in general to the exterior of the diaphragm. The deposited material may be subjected to pressure by forcing the two parts of the molds together in a press indicated diagrammatically at 53, and if desired steam or other heating medium may be applied to the interior of the molds through the conduits 54 and 55 to hasten the drying or curing process. To produce the recess in the neck for the voice coil 18, a two part collar indicated at 56 may be used, this arrangement making it possible to remove the completed diaphragm from the mold.

It is to be noted that the principal areas of the diaphragm may be very thin, that is, of the order of .005" whereas the strengthened portions may be several times as thick, having thicknesses of ⅛" or even ¼" if desired. The materials employed preferably comprise cotton, silk, wool, rayon or paper fibers, while binders of lacquer, Bakelite resins and similar materials are preferred in the production of acoustic devices. It is to be noted that different binders and different materials may be employed for different areas of the devices, for example, the initial deposit may be made of a mixture of rayon fibers and paper pulp with a binder of lacquer while the reinforcing areas may be of a more rigid material produced, for example, by depositing the same fibers with a binder composed of a Bakelite resin which will become quite rigid upon curing.

In carrying out the spraying operation I may employ varying percentages of binder and fibrous material, the composition of the deposited layer being controlled by varying the rate of discharge of the two spray guns. For example, in producing an acoustic diaphragm I preferably deposit a comparatively small percentage of binder so that the completed diaphragm consists principally of the fibrous material with only sufficient binder to hold the fibers together and preferably to render the assembly somewhat moisture-proof. Thus, the completed diaphragm may comprise by weight about 90 to 95 percent fibrous material with or without fibers, and about 5 to 10 percent binder.

In Figs. 6 and 7 I have shown my invention as applied to an entirely different type of article. In these figures I have illustrated a cylindrical form shown generally at 60, closed at one end as at 61 and having an opening 62 at the other. Such forms which may be several feet long and two or three feet in diameter are used in the manufacture of rubber linings for tanks such as airplane fuel tanks. The shapes of the forms, of course, vary widely in accordance with different designs of tanks. In use, the rubber is molded around the outside of the form and then, after the rubber has been cured, the form is removed from the interior of the rubber tank lining by breaking the form and removing the pieces. Thus, this process requires a form which can be manufactured economically for it can only be used once, which will have a smooth surface, which will have sufficient strength to support the rubber during the various manufacturing and curing operations and yet which can be broken readily and removed from within the completed rubber tank. Such forms may be produced according to my method by simultaneously spraying a fibrous material and a binder upon the interior surfaces of a two piece mold having the contour of the exterior of the form. In carrying out the spraying operation a relatively thin layer may be deposited first, then the form may be provided with weakened areas or lines 63, by masking these areas or lines, for example, by collapsible wire masks, and continuing the spraying operation until the desired wall thickness is produced as at 64. The spraying operation is carried out by inserting the guns into the mold through an opening corresponding to the opening 62.

For the production of such forms I have found that a mixture of pulp fibers or ground wood, and plaster of Paris is particularly suitable. I spray the pulp fibers from one gun in the dry state and simultaneously spray a mixture of about 50 percent gypsum and 50 percent water from the other gun. The guns are adjusted so that in the completed form the fibrous material is about 10 to 30 percent by weight and the balance is composed of plaster of Paris. The material so sprayed sets up rapidly to provide a form which is rigid and has a smooth external surface but which can be fractured along the lines 63 to produce pieces that can be removed through the opening 62, so that after the molding operation has been carried out the form can be destroyed easily and the pieces removed from the interior of the tank.

From the foregoing description of my invention it will be evident that I have provided a method for the manufacture of hollow articles of fibrous materials which can be employed to produce a wide variety of articles having widely varying characteristics. My method requires a minimum of investment in machinery and equipment and by reason of the separate spraying of the binder and fibrous materials, the ease of handling of the materials is greatly increased and the amounts of binder material required are considerably reduced.

While I have disclosed herein an apparatus embodying only two spray guns, it is to be understood that more than two guns may be employed. Additional guns may be used to spray different fibrous materials, fillers, or binders if desired. All of the materials are atomized and discharged in finely divided condition with the result that they are intimately mixed in the air in their passage from the respective nozzles to the form. Inasmuch as the fibrous material and filler, if any, are sprayed separately from the binder, no excessive quantity of solvent or supporting vehicle for the binder is required, thus it is possible to employ vehicles other than water, whereas with previous suction depositing methods such great quantities of liquid were required to produce the necessary suspension of the pulp materials that it was practical only to employ water suspensions or emulsions. With my method there is substantially no limit to the thickness of material that can be deposited and various materials can be used to provide different characteristics in different areas of the same integrally formed article. As shown in the drawings, my method is particularly adapted to the production of acoustic diaphragms and also to the production of such widely different devices as forms for the manufacture of rubber articles. Articles made according to my invention have advantageous characteristics for by my method the materials and thicknesses of material can be selected to produce the best results in the finished product.

Those skilled in the art will appreciate that various changes and modifications can be made in my invention without departing from the spirit and scope thereof. It is further to be understood that various other articles can advantageously be produced by my method. Accordingly, my patent is not limited by the foregoing description of preferred forms of my invention or in any manner other than by the scope of the appended claims.

I claim:

1. A hollow acoustic diaphragm comprising an integral deposit of fibrous material and a binder and having a conical portion and a supporting rim portion, the supporting rim portion being formed integrally with the conical portion and having a thickness several times as great as the major portion of the conical portion.

2. An acoustic diaphragm comprising an integral deposit of fibrous material and a binder and having a conical portion and a substantially cylindrical voice coil support formed integrally therewith at the apex of the conical portion, said voice coil support having a thickened reinforcing portion at the end thereof adjacent said conical portion, and said conical portion having thickened reinforcing ribs extending from the reinforcing portion of said voice coil support toward the open end of said conical portion.

JOSEPH B. BRENNAN.